United States Patent
Colatriano et al.

(10) Patent No.: US 9,725,780 B2
(45) Date of Patent: Aug. 8, 2017

(54) MODULAR MICRO MILL AND METHOD OF MANUFACTURING A STEEL LONG PRODUCT

(71) Applicant: M3 Steel Tech Inc., Toronto (CA)

(72) Inventors: Lou Colatriano, Trophy Club, TX (US); Mike Levick, Thornhill (CA); Joe Pataki, Toronto (CA)

(73) Assignee: M3 STEEL TECH, Toronto, Ontario (CA)

( * ) Notice: Subject to any disclaimer, the term of this patent is extended or adjusted under 35 U.S.C. 154(b) by 0 days.

(21) Appl. No.: 14/738,085

(22) Filed: Jun. 12, 2015

(65) Prior Publication Data

US 2015/0360282 A1    Dec. 17, 2015

Related U.S. Application Data

(60) Provisional application No. 62/011,891, filed on Jun. 13, 2014.

(51) Int. Cl.
*B22D 11/16*    (2006.01)
*C21D 1/42*    (2006.01)
(Continued)

(52) U.S. Cl.
CPC .............. *C21D 1/42* (2013.01); *B21B 1/466* (2013.01); *B22D 11/147* (2013.01); *C21D 6/00* (2013.01);
(Continued)

(58) Field of Classification Search
CPC . B22D 11/16; C21D 9/52; C21D 7/12; C21D 11/00
(Continued)

(56) References Cited

U.S. PATENT DOCUMENTS 4,836,273 A * 6/1989 Cignetti ................ C21C 5/5241
                                                                164/471
5,467,519 A  11/1995 Tippins et al.
(Continued)

FOREIGN PATENT DOCUMENTS

CN        201046853 Y    4/2008
GB         679017        9/1952
(Continued)

*Primary Examiner* — Scott Kastler
(74) *Attorney, Agent, or Firm* — Shumaker, Loop & Kendrick, LLP; James D. Miller

(57) ABSTRACT

A modular micro mill for manufacturing steel long product from scrap metal using an induction melting furnace is disclosed. Scrap or pre-refined metal is delivered and melted in the induction melting furnace, the melted steel then being transferred by a preheated tundish to a casting station for producing billets. From the caster the billets are transferred directly to a billet staging station and stored in queue for delivering to main conveyor leading directly to the rolling mill without being cooled to ambient. The bars produced by the rolling mill are then quenched to impart desired metallurgical properties within the finished product. A control system runs the operation of the production line of the modular micro mill, the control system specifically adapting production rates, conveyor speeds, temperatures, etc. of components upstream within the production line based on the specific requirements and/or dimensions of the finished product exiting the production line.

23 Claims, 11 Drawing Sheets

(51) Int. Cl.
*C21D 9/52* (2006.01)
*C21D 11/00* (2006.01)
*C21D 7/13* (2006.01)
*C21D 6/00* (2006.01)
*B22D 11/14* (2006.01)
*B21B 1/46* (2006.01)

(52) U.S. Cl.
CPC ............... *C21D 7/13* (2013.01); *C21D 9/52* (2013.01); *C21D 11/00* (2013.01); *Y02P 10/212* (2015.11); *Y02P 10/253* (2015.11); *Y10T 29/5184* (2015.01)

(58) Field of Classification Search
USPC ............................................. 266/143
See application file for complete search history.

(56) References Cited

U.S. PATENT DOCUMENTS

| | | |
|---|---|---|
| 5,542,165 A | 8/1996 | Coassin et al. |
| 5,924,184 A | 7/1999 | Donini et al. |
| 6,280,542 B1 | 8/2001 | Cornelissen et al. |
| 6,289,972 B1 | 9/2001 | Benedetti |
| 6,783,612 B2 | 8/2004 | Benedetti |
| 6,891,139 B2 | 5/2005 | Iijima et al. |
| 7,343,961 B2 | 3/2008 | Arvedi |
| 7,491,276 B2 | 2/2009 | Wehage et al. |
| 7,832,460 B2 | 11/2010 | Arvedi |
| 7,967,056 B2 | 6/2011 | Arvedi |
| 8,011,418 B2 | 9/2011 | Rosenthal et al. |
| 8,025,092 B2 | 9/2011 | Arvedi |
| 8,276,647 B2 | 10/2012 | Hohenbichler et al. |
| 8,945,319 B2 | 2/2015 | Tachibana et al. |
| 2004/0060619 A1 | 4/2004 | Sakata et al. |
| 2008/0028813 A1 | 2/2008 | Arvedi et al. |
| 2008/0196236 A1* | 8/2008 | Giuseppe ............... B21B 1/08 29/527.6 |
| 2010/0175452 A1 | 7/2010 | Ohlert et al. |
| 2011/0251712 A1 | 10/2011 | Schluter et al. |
| 2012/0018113 A1 | 1/2012 | Schwellenbach et al. |
| 2012/0048499 A1 | 3/2012 | Maeland et al. |
| 2013/0186588 A1 | 7/2013 | Eckerstorfer et al. |
| 2013/0192790 A1 | 8/2013 | Eckerstorfer et al. |
| 2014/0054002 A1* | 2/2014 | Castellani ............... B21B 1/46 164/493 |
| 2014/0072824 A1 | 3/2014 | Linzer et al. |
| 2014/0083644 A1 | 3/2014 | Schwellenbach et al. |
| 2015/0360282 A1* | 12/2015 | Colatriano ............... C21D 9/52 148/541 |

FOREIGN PATENT DOCUMENTS

| | | |
|---|---|---|
| RU | 53944 U1 | 6/2006 |
| RU | 2542049 C1 | 2/2015 |

* cited by examiner

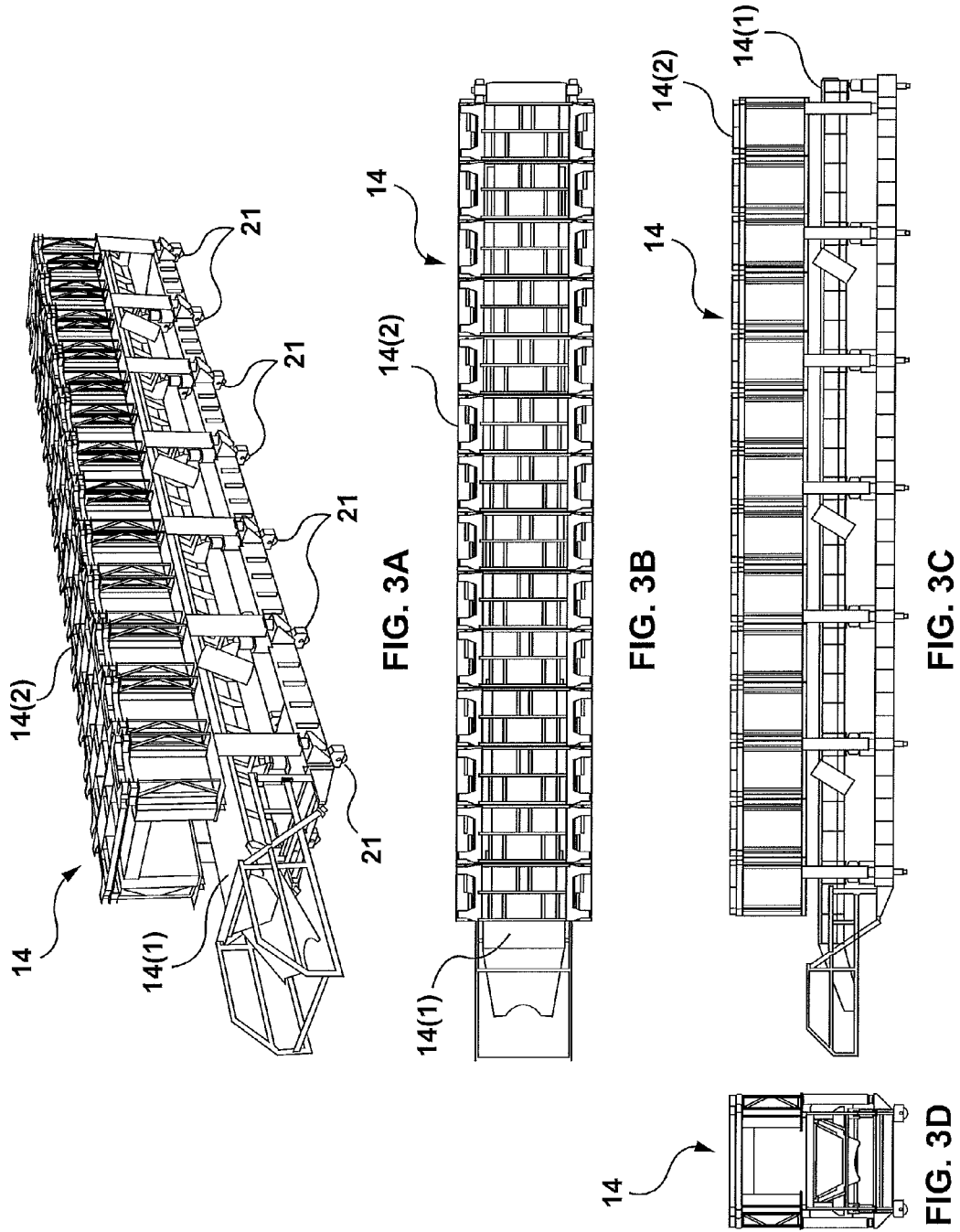

| Product Name | Finish Speed (fpm) |
|---|---|
| # 3x3 | 1190 |
| # 4x2 | 982 |
| # 5 | 1011 |
| # 6 | 892 |
| # 7 | 601 |
| # 8 | 497 |
| # 10 | 309 |
| # 14 | 174 |

FIG. 6

MODULAR MICRO MILL AND METHOD OF MANUFACTURING A STEEL LONG PRODUCT

CROSS-REFERENCE TO RELATED APPLICATION

This application claims priority to and the benefit of U.S. Provisional Patent Application No. 62/011,891 filed Jun. 13, 2014 under the title "MODULAR MICRO MILL AND METHOD OF MANUFACTURING A STEEL LONG PRODUCT". The content of the above patent application is hereby expressly incorporated by reference into the detailed description of the present application.

TECHNICAL FIELD

The invention relates to a modular micro mill for manufacturing a steel product. In particular, the invention relates to a modular micro mill for manufacturing steel long product from scrap metal using induction melting furnaces wherein the melting and casting portion of the plant is linked directly to the rolling portion of the plant to provide a more continuous, overall production process.

BACKGROUND

Traditional steelmaking processes typically involve melting scrap steel using an electric arc furnace (EAF) and producing large amounts of standard sized billets through the casting process that are then cooled and stored on the grounds of the mill. The standard sized billets stored in inventory at the mill site must then be returned to the plant or mill and re-heated prior to entry into the rolling mill for forming various products. As only standard sized billets are stored in inventory, only certain, generally standard lengths of product can be formed. In instances where more customized product is required, the standard lengths of product are cut to size resulting in material waste. Accordingly, traditional steelmaking processes can be characterised, generally, as having two main stages or phases of operation with the melting and casting stages occurring in one portion of the plant and the rolling of the product occurring in another portion of the plant with a cooling stage and storage period occurring between the two main stages of the operation. Therefore, traditional steelmaking processes are rather discontinuous operations requiring a lengthy cooling stage in between processing in the melting and casting portion of the plant and processing in the rolling portion of the plant often requiring the storage of inventory.

Electric arc furnaces used for steelmaking processes are generally quite large (e.g. 120 ton units) and require large amounts of electrical power in order to run at capacity. Traditional steelmaking mills are also generally quite large scale operations requiring large infrastructure. The large infrastructure is not only required to accommodate the large-sized electric arc furnaces that are traditionally used in these operations, but is also required in order to ensure a production scale that is sufficient to produce large amounts of steel in order to meet demand in a cost effective manner. Large steel-making operations of this type generally require a large tract of land that is typically far removed from city centres in order to accommodate the large infrastructure required for traditional steelmaking facilities and in order to meet zoning and/or environmental requirements. Large scale traditional steelmaking operations are, therefore, often limited in terms of their location and are also often associated with significant transport costs related to the transport of materials/product to and from the plant.

Due in part to changing economies and environmental concerns, there is a need for improved and/or alternative steelmaking processes and facilities that may offer a more continuous and efficient process, and that are more adaptable to changing economic and environmental landscapes.

SUMMARY OF THE PRESENT DISCLOSURE

According to an example embodiment of the present disclosure there is provided a modular micro mill for manufacturing a steel long product, comprising an induction melting furnace for melting pre-refined metal; a casting station arranged downstream from the induction melting furnace for receiving melted steel from said furnaces, the casting station forming two strands of billets; a rolling mill arranged downstream from said casting station, the rolling mill comprising a series of roll stands for rolling and/or shaping the billets into a long product having a predetermined shape and form; and a billet staging station arranged intermediate said casting station and said rolling mill, said billet staging station receiving said two strands of billets from said casting station and alternatingly delivering said billets directly to said rolling mill without cooling; wherein the modular micro mill has an overall production rate of approximately 200,000-225,000 tons per year.

According to another example embodiment of the present disclosure there is provided a method of making a steel long product comprising the steps of delivering pre-refined steel to one of two induction melting furnaces in an alternating batch-style process; melting the pre-refined steel in said induction melting furnace; delivering melted steel to a casting station for casting two strands of steel billets at a rate of approximately 30 tons/hr with a speed of at least 110 ipm; accumulating steel billets from each of said strands of billets in a billet staging station for delivery to a main conveyor; re-heating said billets on said main conveyor; delivering said re-heated billets on said main conveyor to a rolling mill; rolling said heated billets through a series of roll stands within said rolling mill for forming a steel long product having a predetermined form, said rolling mill operating at a speed in the range of about 170 fpm to about 1500 fpm; and quenching said steel product in a spray system of a thermo-processing system; cooling said steel product on a cooling bed; and cutting said steel product to a predetermined length.

BRIEF DESCRIPTION OF THE DRAWINGS

Reference will now be made, by way of example, to the accompanying drawings which show example embodiments of the present application, and in which:

FIG. 3A is a perspective view of an exemplary pre-heating conveyor system of the modular micro mill of FIG. 1;

FIG. 3B is a top plan view of the pre-heating conveyor system of the modular micro mill of FIG. 3A;

FIG. 3C is a side elevation view of the pre-heating conveyor system of the modular micro mill of FIG. 3A;

FIG. 3D is an end view of the pre-heating conveyor system of the modular micro mill of FIG. 3A;

FIG. 6 is a table of exemplary finishing speeds of the modular micro mill; and

Similar reference numerals may have been used in different figures to denote similar components.

DESCRIPTION OF EXAMPLE EMBODIMENTS

Figure 1:
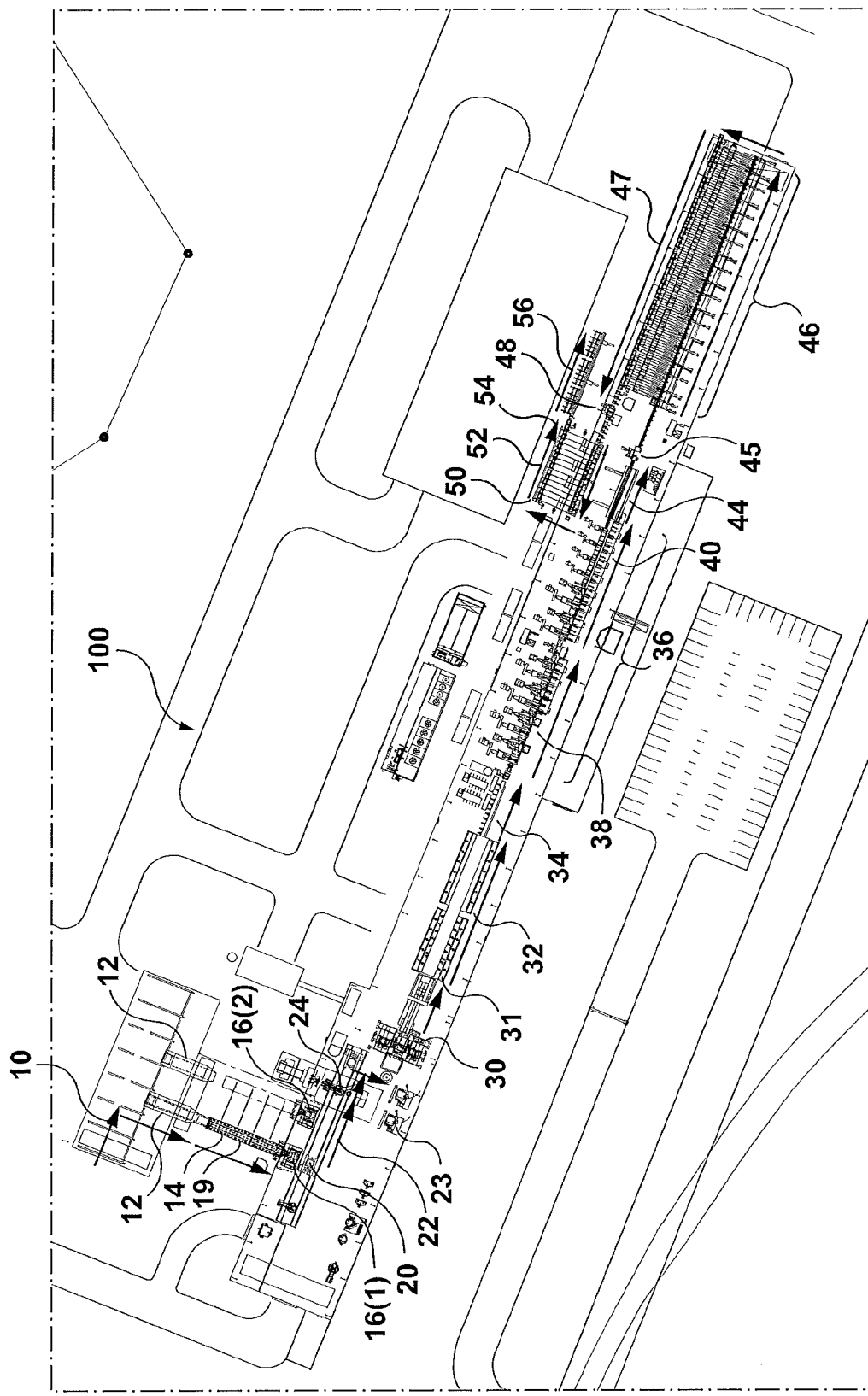
FIG. 1 is a schematic, bird's eye view of an exemplary embodiment of a modular micro mill according to the present disclosure.

Referring now to FIG. 1, there is shown a schematic, bird's eye view illustrating an exemplary embodiment of a modular micro mill 100 according to the present disclosure. The modular micro mill 100 is particularly suited for the production of steel long product, for example, steel rebar on the scale of about approximately 200,000-225,000 ton/yr as will be described in further detail below. However, it will be understood that the modular micro mill 100 may be adapted in order to meet specific production requirements depending on the particular application or finished product being produced by the specific modular micro mill.

As shown schematically in FIG. 1, the modular micro mill 100 comprises a scrap loading crane 10 for transferring scrap or pre-refined metal from storage bins to a first conveyor 12 such as a loading or charge conveyor. In the subject exemplary embodiment, the first conveyor 12 transfers the pre-refined metal to a second conveyor system 14 for delivering the pre-refined metal to an induction melting furnace 16. In the subject embodiment, the second conveyor system 14 is a pre-heating conveyor system where the scrap metal is preheated, for example, by natural gas to a temperature of about 900° F. prior to delivery to the induction melting furnace 16. A second conveyor system 14 in the form of a pre-heating conveyor system is shown more clearly in FIGS. 3A-3D. As shown, the pre-heating conveyor system generally comprises a conveyor 14(1) enclosed within a chamber portion 14(2), the chamber portion 14(2) housing a combustion system having a combustion firing capacity of about, for example, 22,000,000 Btu/hr. The chamber 14(2) is sized appropriately to ensure that the pre-refined metal can be comfortably transferred through the chamber 14(2) on the conveyor 14(1), the chamber and conveyor 14(1), 14(2) together having a length to allow the pre-refined metal to reach the desired pre-heated temperature before being delivered to the induction melting furnace 16.

The scrap loading crane 10 is generally controlled by remote control and will typically be operated so that the speed at which the pre-refined metal is loaded onto the charge conveyor 12 exceeds the consumption rate of the induction melting furnace 16. In one exemplary embodiment, the chamber portion 14(2) of the pre-heating second conveyor system 14 is approximately, but not limited to 60 ft long, 5 ft wide and 5-6 ft high with the pre-heating, second conveyor system 14 having the ability to heat approximately 45 tons of scrap per hour from ambient temperature to a temperature of about 900° F. The pre-heating second conveyor system 14 may also be provided with an afterburner (not shown) to assist with exhaust gas cleaning from the pre-heating second conveyor system 14. The hot products of combustion of the natural gas within the pre-heating second conveyor system 14 will discharge via an adjacent chamber where it is burned off. The modular micro mill 100 is equipped with an overall fume collection system incorporating appropriate ducting and canopy structures, in accordance with principles known in the art, that are specifically adapted and appropriately structured based on the particular application of the modular micro mill 100 to ensure that the pre-heating second conveyor system 14 meets specific, predetermined or government regulated emission controls and/or environmental requirements. In some instances, where the costs and/or environmental impact (e.g. emissions associated with burning natural gas, etc.) associated with pre-heating the pre-refined metal are undesirable, the pre-refined metal can simply be delivered to the induction melting furnace 16 at ambient temperature via the second conveyor system 14 without being pre-heated while travelling along the conveyor 14(1). In instances where pre-heating of the pre-refined metal is not required or deemed suitable for a particular application, the second conveyor system 14 would simply function as a conveyor without necessarily requiring the chamber portion 14(2) and additional fume collection system for collecting, treating and discharging the hot products of combustion. Therefore, while the embodiment described below relates to a second conveyor system 14 in the form or a pre-heating conveyor system 14, it will be understood that the modular micro mill 100 is not intended to be limited to including a pre-heating second conveyor system 14 and that embodiments where the pre-refined metal is delivered directly to the induction furnace 16 without pre-heating are also included in the scope of the present disclosure.

Figure 5:
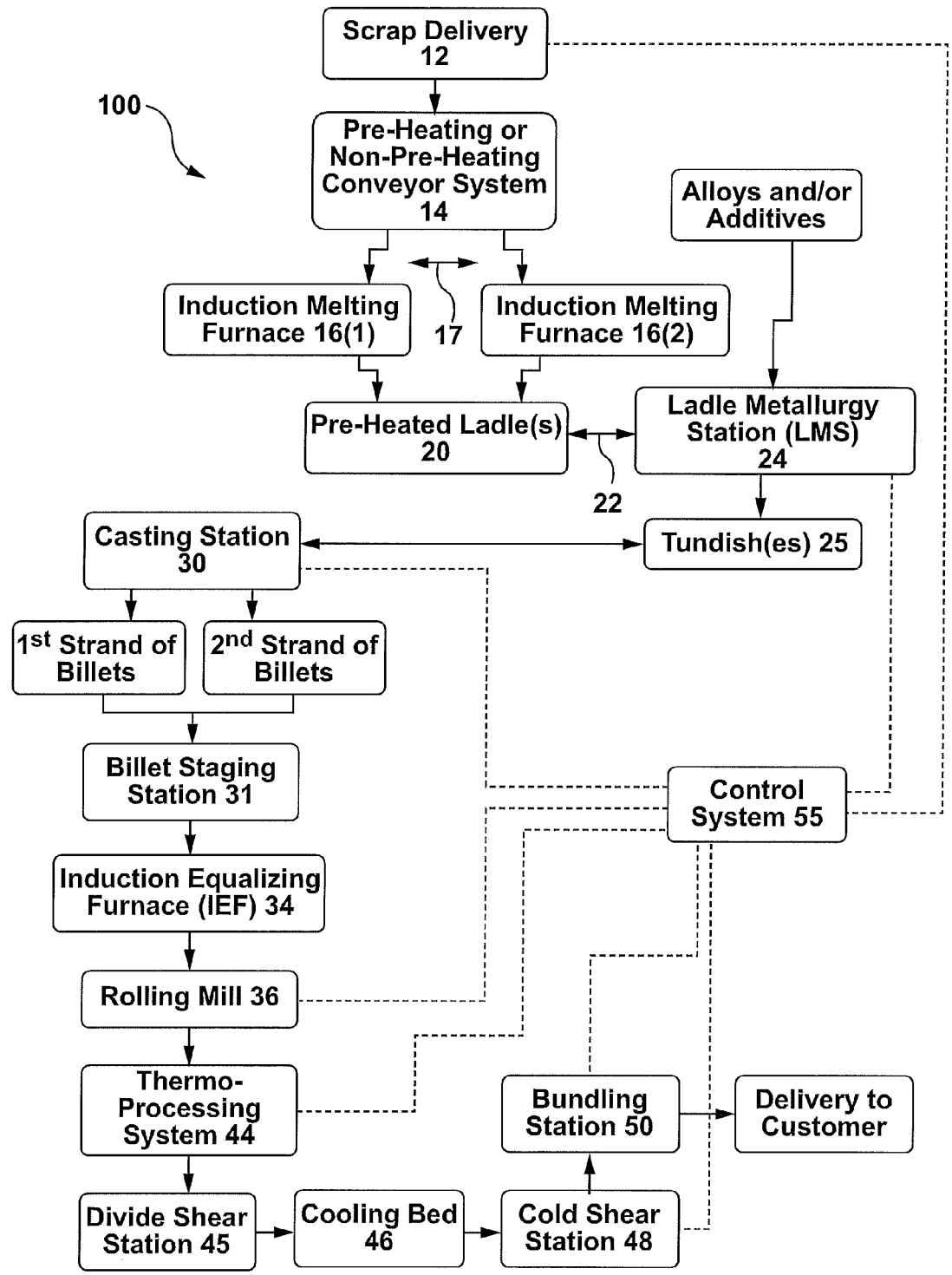
FIG. 5 is a flow chart illustrating the operation of the modular micro mill according to the exemplary embodiment of the present disclosure.
Figure 5A:
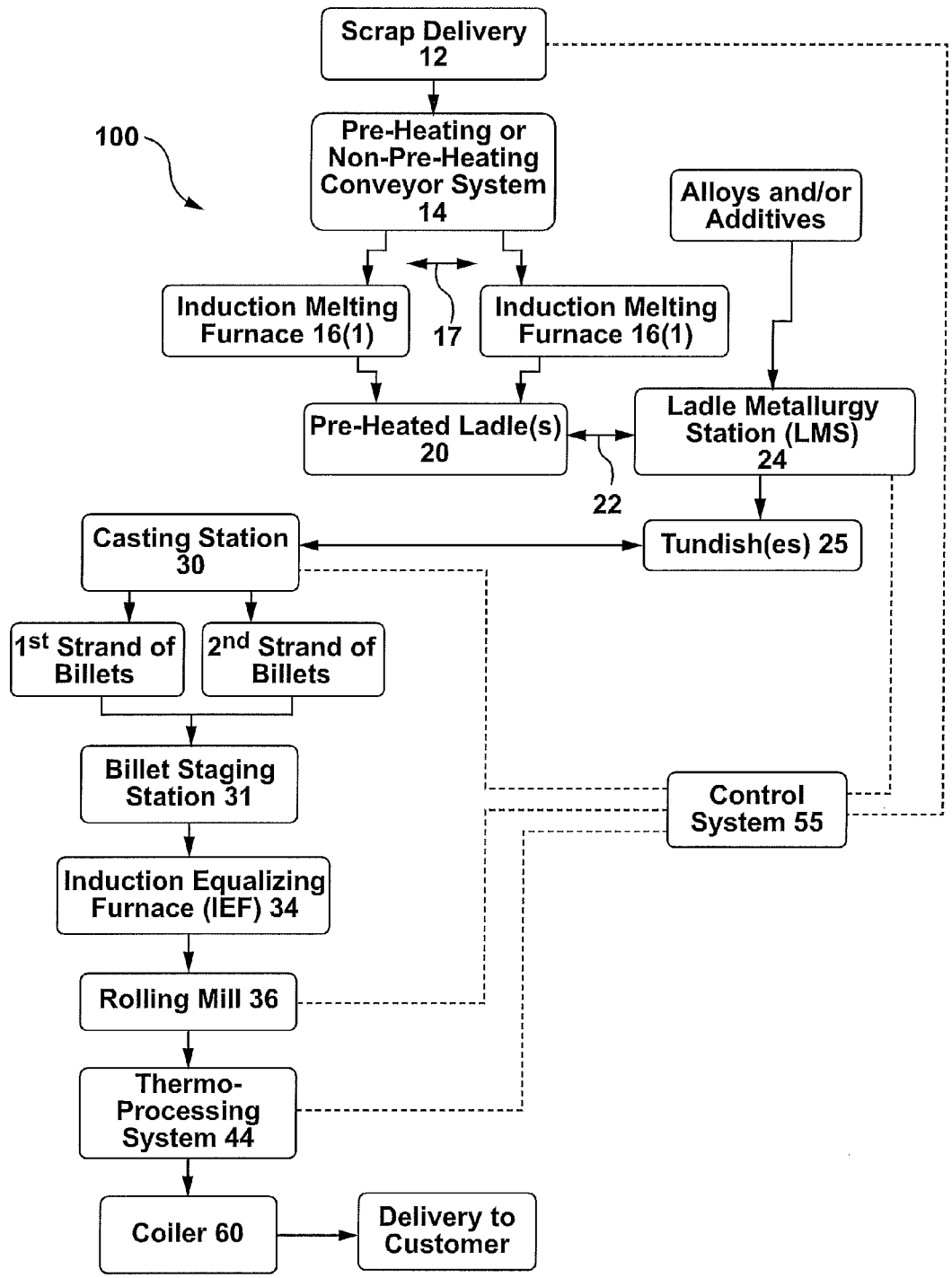
FIG. 5A is a flow chart illustrating the operation of the modular micro mill according to the exemplary embodiment of FIG. 1A.

In the exemplary embodiment illustrated in FIG. 1, rather than only providing a single induction melting furnace, a pair of induction melting furnaces 16(1), 16(2) is provided with the furnaces 16(1), 16(2) being arranged generally side-by-side. The induction melting furnaces 16(1), 16(2) are arranged and configured to receive the pre-refined metal from the pre-heating conveyor 14 in an alternating, batch-type process. More specifically, in the subject exemplary embodiment, the modular micro mill 100 will operate using one of the induction melting furnaces, for instance the first induction melting furnace 16(1), until the first induction melting furnace 16(1) requires relining or other maintenance, or until a switch in the furnaces is dictated by an alternating sequence of operation. At that point, the first induction melting furnace 16(1) will be put on "standby" or "reline" while operation of the modular micro mill 100 switches over to the second induction melting furnace 16(2) as the second conveyor 14 is adapted to shift from a first operating position delivering scrap or pre-refined metal to the first induction furnace 16(1) to a second operating position delivering the pre-refined metal to the second induction melting furnace 16(2), and vice versa as indicated schematically by arrow 17 on FIG. 5, 5A, once the second induction melting furnace 16(2) has reached the end of its cycle and is ready for maintenance and/or relining. Accordingly, while one induction melting furnace 16(1), 16(2) is in operation, the other induction melting furnace 16(1), 16(2) is "off-line" in reline or on standby. When a pair of induction melting furnaces 16(1), 16(2) is provided, the individual induction melting furnaces 16(1), 16(2) can also be operated in an alternating manner or sequence until reline or maintenance on either furnace is required. In general, an operation cycle for each of the induction melting furnaces 16(1), 16(2) is about one week in length. In operation, the first and second conveyors 12, 14 together will feed the first of two induction melting furnaces 16(1), 16(2) for an operation cycle. Once the operation cycle for one of the furnaces 16(1), 16(2) is complete, the second conveyor system 14 will be stopped and be shut-off while the corresponding furnace 16(1), 16(2) is placed "offline". The second conveyor system 14 will then travel sideways along rollers 21 (see for instance FIGS. 3A-3c), which may be mounted in a corresponding track structure on the floor of the mill, and be brought into the second operating position associated with the second induction furnace 16(2). Once in position, operation of the first and second conveyor systems 12, 14 for delivering pre-refined steel to the corresponding furnace 16(2) will resume for another operation cycle while the first furnace is being maintained. Accordingly, the subject modular micro mill 100 does not require two separate conveyor systems associated with each induction melting furnace 16(1), 16(2) since the second conveyor system 14 is adapted to toggle or switch between its two operating positions and the two induction melting furnaces 16(1), 16(2).

In operation, the pre-refined metal is fed directly from the second conveyor 14 to the induction melting furnace 16(1), 16(2) where it is melted, the molten metal generally reaching a temperature of about 2900° F. within the induction furnace 16(1), 16(2) where it can then be tapped or poured from the induction furnace 16(1), 16(2) into a pre-heated ladle 20. When a pre-heating second conveyor system 14 is used, since the pre-refined metal entering the induction melting furnace 16(1), 16(2) has already been heated to a temperature of about 900° F., the amount of electrical energy required to melt the pre-refined metal and bring it to a temperature of about 2900° F. is significantly reduced as compared to melting pre-refined metal from ambient temperature. In some cases it has been found that pre-heating the pre-refined metal prior to the melting step contributes to an overall reduction in operating costs of the modular micro mill 100 as the costs of relining and overall maintenance are significantly less as compared to other known steelmaking processes. In addition to the overall cost savings associated with pre-heating the pre-refined steel, it has been found that melting the pre-heated, pre-refined metal in an induction furnace, as opposed to an electric arc furnace as is used in traditional steel making processes, generates much less slag during the melting process. Accordingly, the modular micro mill 100 according to the subject exemplary embodiment does not require more complex slag removal stations and or steps allowing, in part, for a simpler and "cleaner" overall steelmaking process.

After melting of the pre-refined metal is complete in the induction furnace 16(1), 16(2), the molten metal is tapped or poured into the preheated ladle 20. The preheated ladle 20 is first heated under a vertical pre-heater, the preheated ladle 20 then being loaded onto a ladle transfer car 22 where it is brought to the tap or outlet of the appropriate induction furnace 16(1), 16(2) where it receives the molten metal from the corresponding furnace 16(1), 16(2). The preheated ladle 20 now filled with molten metal is then transferred to a ladle furnace or ladle metallurgy station (LMS) 24 for further processing, the ladle transfer car, as represented by arrow 22 in FIG. 5, 5A, with ladle 20 returning to a park position/area 23 under the vertical pre-heater station until its next use.

Depending upon the particular application of the modular micro mill 100 and the specific product being produced, any necessary alloys and/or additives (if required) will be added at the ladle furnace or ladle metallurgy station 24 in accordance with principles known in the art. Examples of possible alloys and/or additives are, but not limited to, silicon, silicon-manganese, high carbon manganese, carbon, lime, aluminum and sodium aluminate tetraflouride.

After metallurgical trimming of the steel and the final temperature is reached in the ladle metallurgy station 24, the ladle 20 is brought to a casting station 30 for casting the molten metal into billets 29. More specifically, upon completion of the steel processing at the induction melting furnaces 16(1), 16(2) and the ladle metallurgy station (LMS) 24, the ladle 20 of molten steel is brought to the casting station 30 of the modular micro mill 100. The ladle 20 is typically placed on a dual arm turret and positioned over a preheated tundish 25, as shown schematically in FIG. 4. The ladle 20 is equipped with a slide gate which is opened allowing the molten metal to fill the tundish 25. As the tundish(es) 25 used in the process are subject to pre-heating, temperature losses of the molten metal at the casting stage are generally reduced during operation of the modular micro mill 100.

Figure 4:
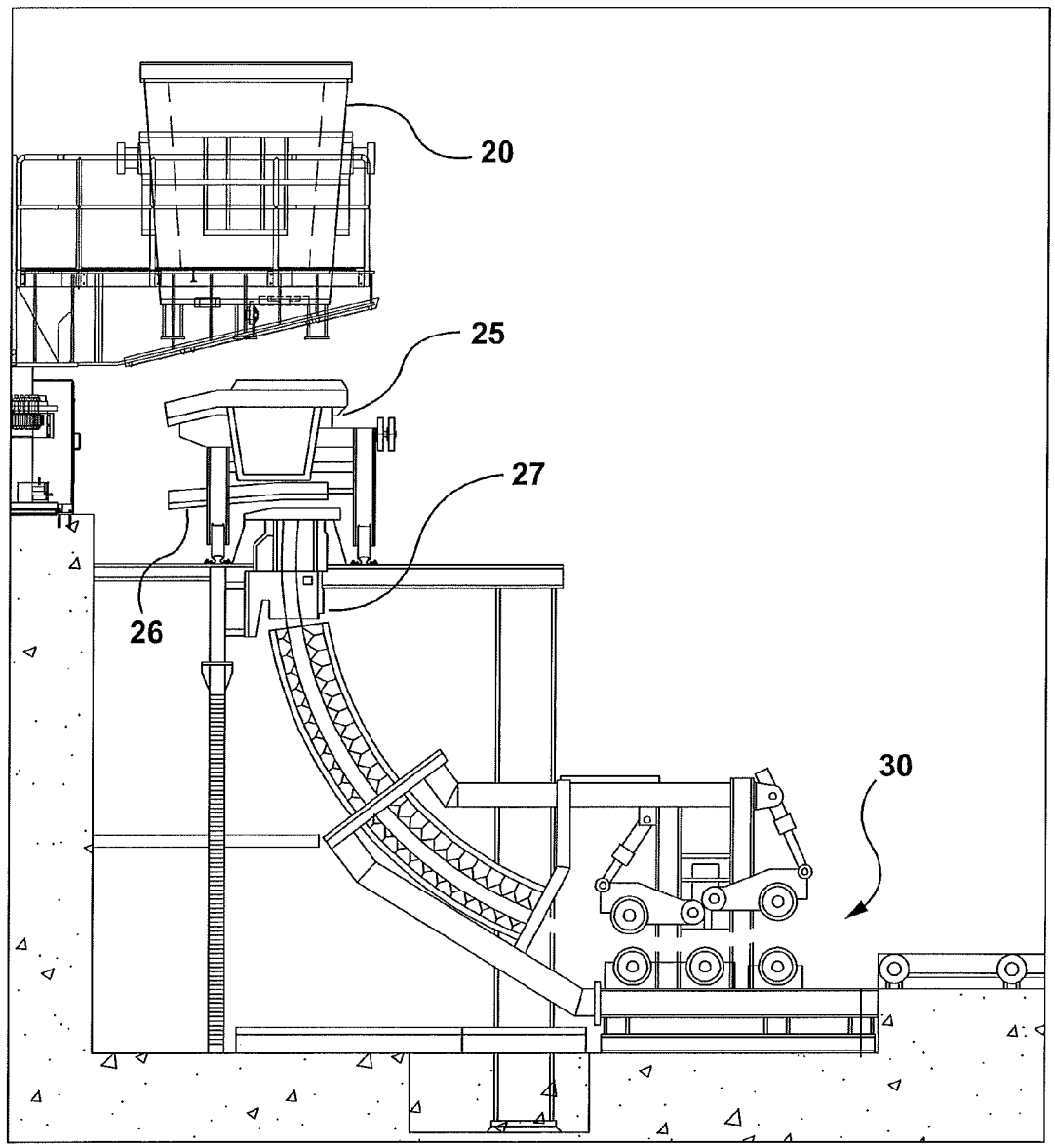
FIG. 4 is a schematic illustration of the casting process of the modular micro mill according to the present disclosure.

As illustrated in FIG. 4, the casting process is started by the opening of the tundish nozzle 26 to fill the mold(s) 27 and then withdrawing the pre-inserted strand dummy bar at a speed generally matching the solidification rate of shell formation of a billet. The main function of the caster 30 is heat removal and solidifying the liquid metal into a predetermined form, for instance, 4½ inch diameter round bars of defect free steel. However, it will be understood that the specific shape/size of the billet or long product from the caster 30 as well as the speed of operation can be adapted to suit the specific need or the particular application of the modular micro mill 100. In the subject exemplary embodiment, the caster 30 produces two separate billet strands that each emerge from the caster 30. The billets 29 are then cut to the desired or predetermined length for the particular application of the mill or the particular product being formed. The billets 29 typically have a maximum length of about 90 ft which is about three times the length of a standard billet produced in traditional steelmaking operations. However, it will be understood that the exact length of the billets 29 will vary depending upon the particular application of the modular micro mill 100 and the specific steel long product being produced based on specific customer requirements.

Figure 7:
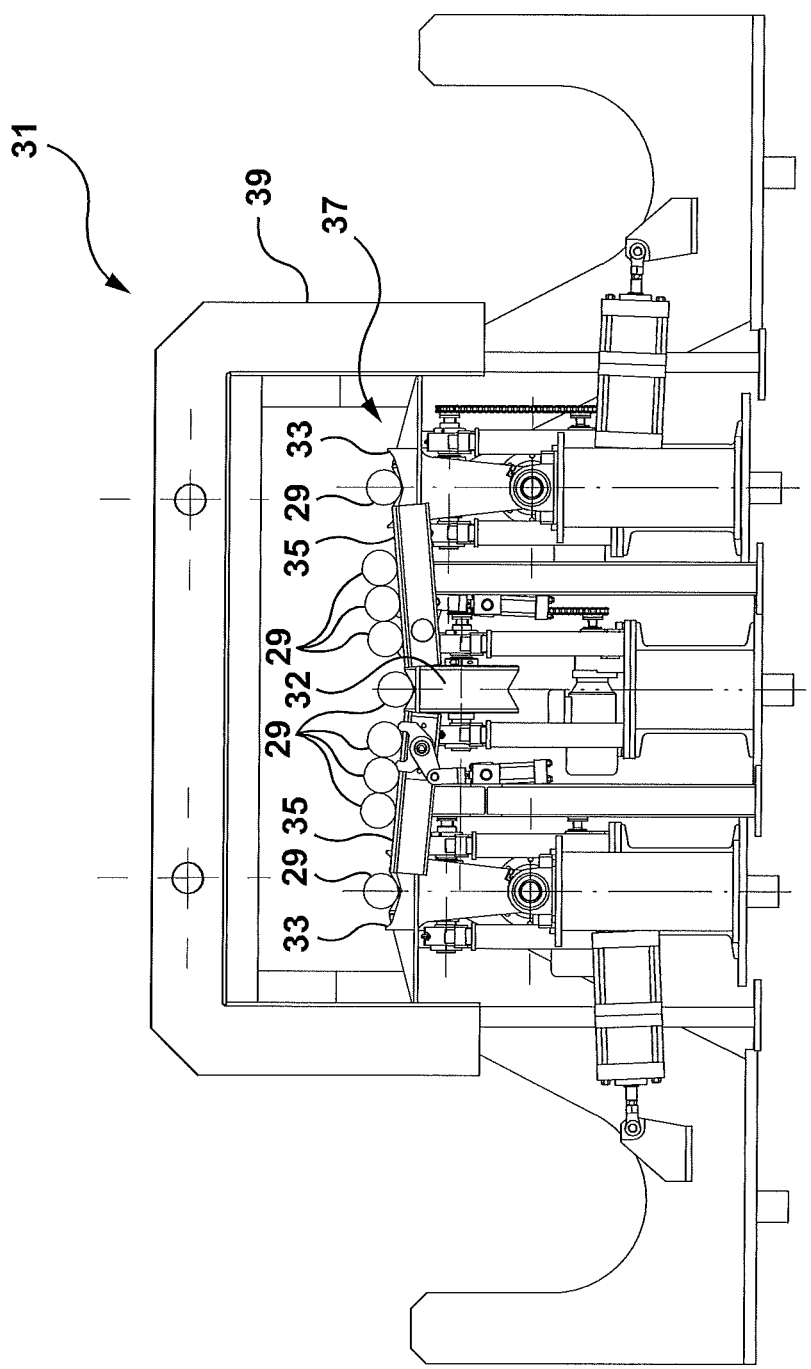
FIG. 7 is an end view of the billet staging station of the modular micro mill.

Once the billets 29 from the caster 30 have been cut to length (e.g. 90 ft.), they enter a billet staging area or station 31 comprising a caster runout table 37 that is made up of three independent conveyors or roller tables as will be described in further detail below. The two billet strands produced by the caster 30 enter the billet staging station 31 on respective roller tables 33, e.g. one for each strand. From the individual roller tables 33, the individual billets 29 are alternatingly accumulated or transferred to a main conveyor or mill run-in conveyor 32. The main conveyor or mill run-in conveyor 32 is interconnected to each of the individual conveyors or roller tables 33 associated with each billet strand by ramps 35 that are arranged at an angle so as to slope downwardly away from the individual conveyors or roller tables 33 towards the main conveyor or mill run-in conveyor 32 as illustrated in FIG. 7. As each billet exits the caster 30 and is cut to length it continues on to its respective roller table or conveyor 33 until it comes to a complete stop. The billet is then transferred from its respective roller table 33, in an alternating fashion, to the mill run-in conveyor 32 via the corresponding ramp 35. Ramps 35 have the capability of accumulating billets 29 produced by the caster 30 prior to their entry into the rolling mill 36 on the mill run-in conveyor 32. If troubleshooting or maintenance in the mill 100 is required downstream from the billet staging station 31 requiring shut-down of the rolling mill (for example), the caster 30 does not necessarily need to be shut down since the caster 30 can continue to produce billets that can be temporarily held in queue on ramps 35. Alternatively, should a problem arise in the melting or casting portion of the modular micro mill 100, the rolling mill and downstream components of the modular micro mill 100 can continue to operate for a time while clearing the backlog of billets 29 that are temporarily held in queue on ramps 35 in the billet staging area 31. Accordingly, the billet staging station 31 contributes to the efficiency of the operation of the modular micro mill 100 and provides for a more continuous overall operation of the mill 100 since the entire operation does not necessarily need to be stopped or shutdown should a problem arise either upstream or downstream of the billet staging station 31.

In order to help prevent or minimize heat losses as billets 29 are transferred from the casting station 30 to the rolling mill 36, the billet staging station 31 may also equipped with a heat shield or cover 39 arranged over top of the caster runout table 37. The heat shield or cover 39 helps to maintain the temperature of the billets 29 in an effort to avoid a more complex re-heating stage prior to entry into the rolling mill 36.

Once the billets 29 have been transferred on to the main or mill run-in conveyor 32 in the billet staging station 31, the billets 29 pass through an induction equalizing furnace (IEF) 34 in order to bring the temperature of the billets 29 back up to a predetermined, desirable temperature suitable for the rolling portion of the mill 100, for instance from about 1600° F. to about 1950° F., the induction equalizing furnace 34 serving to account for any heat loss that may have occurred during the casting and billet staging process.

From the induction equalization furnace 34, the billets 29 proceed directly to the rolling mill 36 portion of the modular micro mill 100. The rolling mill 36 comprises a roughing mill 38 made up of a predetermined amount of roll stands, for instance roll stands #1-#8, the billets passing through the first series of roll stands #1-#8 to form a steel long product having a particular form, e.g. steel bars having a particular form. The head and tail end of the steel bars or long product formed will generally be cut by divide, crop or cobble shears, for example, before passing through the finishing portion 40 of the rolling mill 36. The finishing portion 40 of the rolling mill 36 comprises a predetermined amount of additional roll stands, for instance a second series of roll stands #9-#16. Depending upon the specific long product being produced, the finishing portion 40 of the rolling mill 36 is suitably adapted to the required number of roll stands. In general, the entire rolling mill 36 typically comprises about 16 roll stands in total.

The speed of operation of the rolling mill portion 36 of the modular micro mill 100 will vary depending upon the particular long product being produced, with lower speeds generally be favoured over the higher speeds often used by traditional, higher production mills. In the subject modular micro mill 100, the rolling mill 36 operates with the billets travelling through the rolling mill 36 at speeds generally in the range of 170 fpm-1500 fpm depending upon the particular long product being produced. Accordingly, the speed at which the billets travel through the rolling mill 36 is generally set as a function of the particular long product being produced and the particular size/length of the finished product based on customer requirements. The rolling mill 36 also includes a slitting process where a rolled billet exiting a particular roll stand of the rolling mill 36 is "slit" or "split" lengthwise into two separate strands at one or more stages within the rolling mill 36. The slitting of the billets at various stages within the rolling mill 36 also allows for slower overall speeds within the rolling mill 36 to be achieved. Slower operating speeds through the rolling mill 36 have been known to contribute to overall improved safety since safety risks and/or concerns typically associated with higher operating speeds are somewhat mitigated and/or possibly reduced in modular micro mill 100 since the operating speeds through the rolling mill 36 are generally slower than other known large-scale steelmaking mills. FIG. 6 provides a list of various types of steel long product, as known in the art, that may be produced by modular micro mill 100 and the specific rolling mill speeds employed for each of the products.

Since the billets produced by the caster 30 typically have a length that is about three times the length of standard billets (e.g. approximately 90 ft), a reduced number of billets pass through the rolling mill 36 of the modular micro mill 100 during operation in order to produce the same amount of steel long product as compared to other known steelmaking mills. Since the number of billets entering the roll mill 36 is reduced as a result of the casting operation employed in the modular micro mill 100, the incidence of cobbling (which is encountered in any rolling mill operation) will likely also be reduced contributing to the overall efficiency and/or safety of the production line of modular micro mill 100.

Traditional steelmaking processes generally involve placing hot billets from the caster in a large storage area where they are allowed to cool to ambient temperature. Once the billets have had sufficient time to cool, the billets are transported by crane to a loading conveyor where they proceed to pass through a reheat furnace. Reheat furnaces use natural gas burners to heat the billets to the required rolling temperature. After being reheated, the billets pass through a descaler to remove the scale prior to entering the rolling mill. Accordingly, in traditional steelmaking processes there is typically a disconnect between the melting and casting portion of the mill and the rolling portion of the mill and require additional material handling equipment, processing equipment, energy, operating time and storage space resulting in increased capital and operating costs. As well, the cooling and reheating phases tend to generate additional scale on the formed billets which, in turn, equates to higher yield losses since the scale must be removed prior to rolling. The modular micro mill 100 according to the present disclosure does not require the additional equipment and space for processing the steel billets; therefore, the entire mill structure can be located on a much smaller plot of land than traditional steelmaking mills. As well, by bypassing the traditional cooling step, the subject modular micro mill 100 allows for a more continuous production process or operation without the need for storing a large inventory of billets while they cool and wait further processing.

The modular micro mill 100 according to the present disclosure incorporates a thermo-processing system 44 that is arranged in the production line of the modular micro mill 100 after the rolling mill 36. The thermo-processing system 44 is generally in the form of a nozzle system for quenching and tempering of the rolled long product, e.g. steel bars, in order to improve the metallurgical properties of the product or bar. Incorporating the thermo-processing system 44 into the production line of the modular micro mill 100 allows for thermo-mechanical work hardening and heat treatment of the steel in a single process. The quenching process produces a high strength steel bar or steel long product from inexpensive low carbon steel in lieu of more costly alloying steps earlier in the steelmaking process. The thermo-processing system 44 quenches the surface layer of the bar or long product, which pressurizes and deforms the crystal structure of the intermediate layers, and simultaneously begins to temper the quenched layers using the heat from the bar's core.

In the example embodiment of the modular micro mill 100 where the modular micro mill 100 is arranged to produce 4½ inch round billets, for example, the billets may enter the rolling mill 36 at approximately 1950° F. The billets are then progressively rolled (and slit) to convert them to the final size and shape of the desired long product, for example reinforcing bars or rebar. Before entering the dividing shear station 45 which is arranged downstream from the rolling mill 36, the formed long product moves through the quenching system, which converts the bar's surface layer to martensite and causes it to shrink. The shrinkage pressurizes the core, helping to form the required micro structure. The core remains hot and austenitic. A microprocessor is incorporated into the control system 55 which controls the water flow to the thermo-processing system 44 to manage the temperature difference through the cross-section of the long product. The correct temperature difference assures the process requirements for the long product to have the necessary mechanical properties. As the bar or long product cools, heat flows from the center of the bar or long product to its surface to heat and to correctly temper and form an intermediate ring of martensite and bainite, for example. After the quenching stage within the thermo-processing station 44, the long product is subject to slow cooling which automatically tempers the austenitic core to ferrite and perlite while on the cooling bed. The bars or specific long product produced by the modular micro mill 100, therefore, exhibit a variation in microstructure, having strong tempered martensite in the surface layer of the bar, an intermediate layer of martensite and bainite, and a refined, tough and ductile ferrite and pearlite core. Since the desired metallurgical properties are achieved by quenching as opposed to more complex alloying at the melting stage of the steel making process, significant cost savings may be achieved.

While quenching of metal is known in order to achieve specific mechanical properties, quenching is not typically incorporated into the production line of traditional, North American steelmaking processes since traditional steelmaking processes use alloying techniques in order to achieve the specific strength requirements for the specific product. As well, modifying traditional steel mills to incorporate a thermo-processing system into the production line is generally cost prohibitive. Furthermore, traditional steel mills tend to produce and store a large inventory of product, due to the much larger production scales as compared to the subject modular micro mill 100, which inventory is often stored outdoors and exposed to the elements. Quenched or thermo-processed steel has a tendency to form rust on its outer surface which problem is often exacerbated when the quenched or thermo-processed steel is exposed to the elements for extended periods of time. Finished product having a rusty outer layer is often considered undesirable to customers, which is one of the reasons traditional steelmaking processes tend to avoid quenching or thermo-processing the steel and resort to the more costly route of using alloying to achieve the desired strength properties since the finished product produced by traditional steel mills is often stored outside for long periods of time.

As the scale of production of the subject modular micro mill 100 is much smaller than the production scale found in traditional steel mills and since the production scale can be more specifically adapted to customer needs (e.g. quantity and size of finished product) without requiring the need for storing a large inventory, since the product is shipped directly to the customer and does not require an extended cooling and/or storage period, the risk of rust forming on the quenched or thermo-processed finished product produced by the modular micro mill 100 is significantly reduced and is generally not of concern. Accordingly, incorporating a thermo-processing station 44, generally in the form of a spray system, into the production line and avoiding more costly alloying techniques is particularly suited to the modular micro mill 100 of the present disclosure.

Once the formed long product has been quenched and tempered in the thermo-processing station 44, divide shears 45 cut the bars (or other long product) to cooling bed length, the cut bars or long product being transferred to a cooling bed conveyor structure 46. The cooling bed conveyor structure 46 is generally 200 ft long and can accommodate steel bars or steel long product with a maximum length of about 180 ft. The bars or long product are transferred onto the cooling bed conveyor structure 46 at a temperature of less than about 1800° F. and are walked across the cooling bed by means of the conveyor which further lowers the temperature of the bars or long product to about 400° F.

Once the long product has been cooled on the cooling bed conveyor structure 46, the long product is transferred by means of a cold shear entry conveyor structure 47 and cut to the desired customer length at a cold shear station 48. So as not to create a production bottleneck at the cold shear station 48, which can detrimentally affect overall production rates of the modular micro mill 100, the cold shear station 48 is specifically designed and/or adapted to have an operating capacity that is higher than that of the rolling mill 36.

A bundling station 50 is arranged downstream from the cold shear station 48, the bundling station 50 including a bundler 52 and two strapping machines 54. Upon exiting the cold shear station 48 the product is arranged in sub-bundles, the sub-bundles then being bundled together to form bundles of product having standard sizes by a bundler 52. The bundles, each comprised of one or more sub-bundles, are strapped together by means of two fixed automated strapping machines 54 before being transferred by a bundle discharge conveyor 56 to a collecting table where they are ready to be picked up by a fork lift and transferred to a finished product storage yard for shipping. The finished product is then delivered to the customer using delivery trucks for delivery, generally, within a predetermined radius or geographical area.

A control system 55 is incorporated into the production line of the modular micro mill 100 for controlling the specific production rates of the modular micro mill 100 and allowing the production line of the modular micro mill 100 to be specifically adapted for producing a specific steel long product according to specific customer requirements. By entering the data associated with the product specifications for the finished product into the control system 55, the timing and operation of the cold shear station 48 is modified to ensure that the bars are cut to the appropriate length which in turn modifies the speed of the conveyors through the rolling mill 36 as well as the casting rate through the casting station 30. Accordingly, the control system 55 is arranged so as to modify components upstream in the production line of the modular micro mill 100 based on the specific customer requirements for the finished long product. The modular micro mill 100, therefore, can be specifically tuned and/or adapted to produce tailored or customized products based on specific customer requirements or needs allowing for a more efficient overall production. While the subject modular micro mill 100 is particular suited for producing steel rebar, for example, the modular micro mill 100 may be adapted to produce similar steel long products, as is known in the art, such as but not limited to piping, I-beams, angle, channel, rounds, squares, etc. By specifically adjusting the various components of the modular micro mill 100 based on the specific customer requirements for a particular finished product using control system 55, the operation of the modular micro mill 100 can be specifically adapted for a particular application or production requirement. This operation style differs from traditional steel-making operations where standard sized billets and long product are produced and stored in inventory, the standard inventory product then being cut to order to meet customer needs.

Figure 1A:
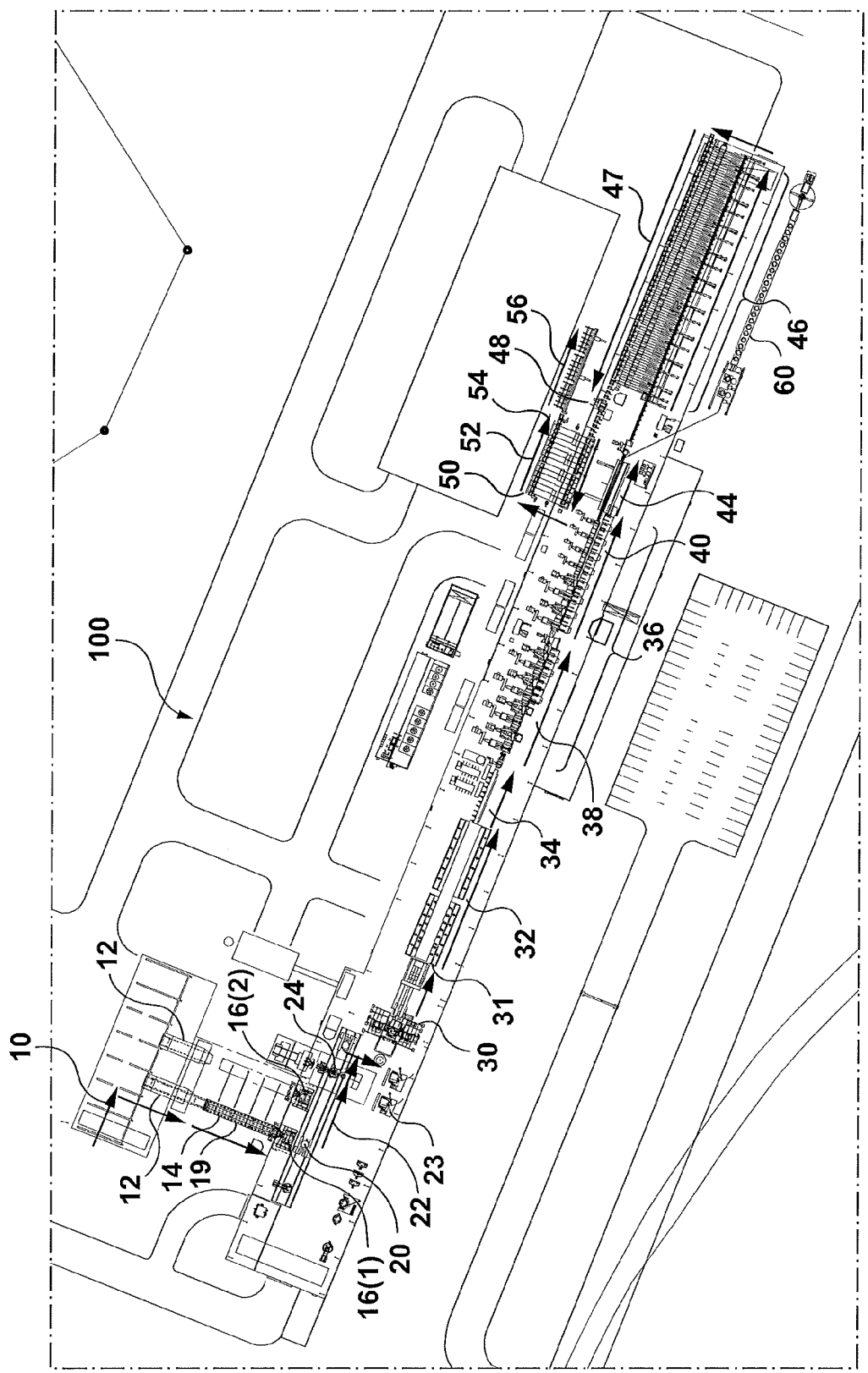
FIG. 1A is a schematic, bird's eye view of an alternate embodiment of the modular micro mill according to the present disclosure.
Figure 2A:
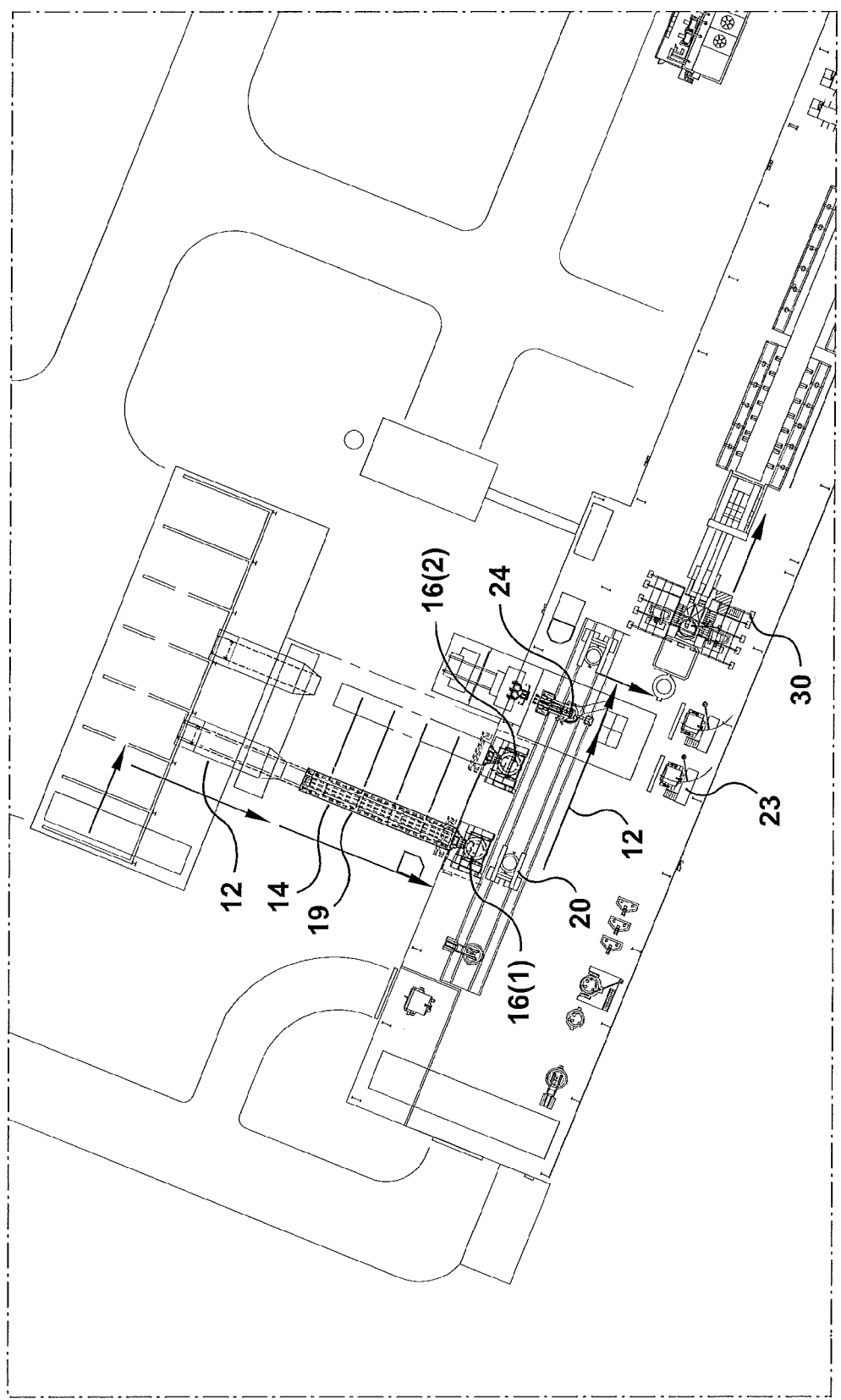
FIG. 2A is a view of the pre-heating and melting portion of the process flow diagram of FIG. 1.
Figure 2B:
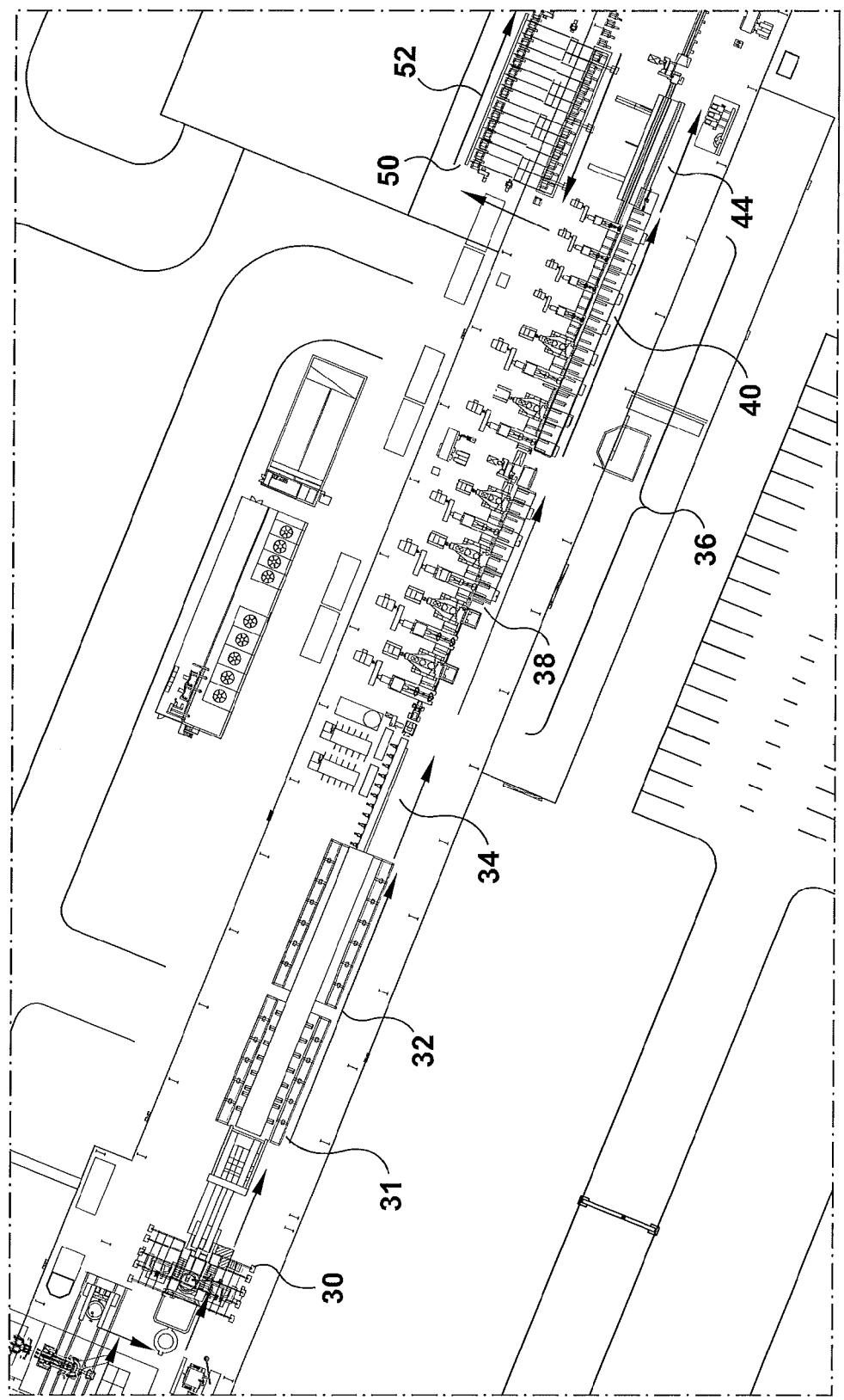
FIG. 2B is a view of the casting and rolling portion of the process flow diagram of FIG. 1.
Figure 2C:
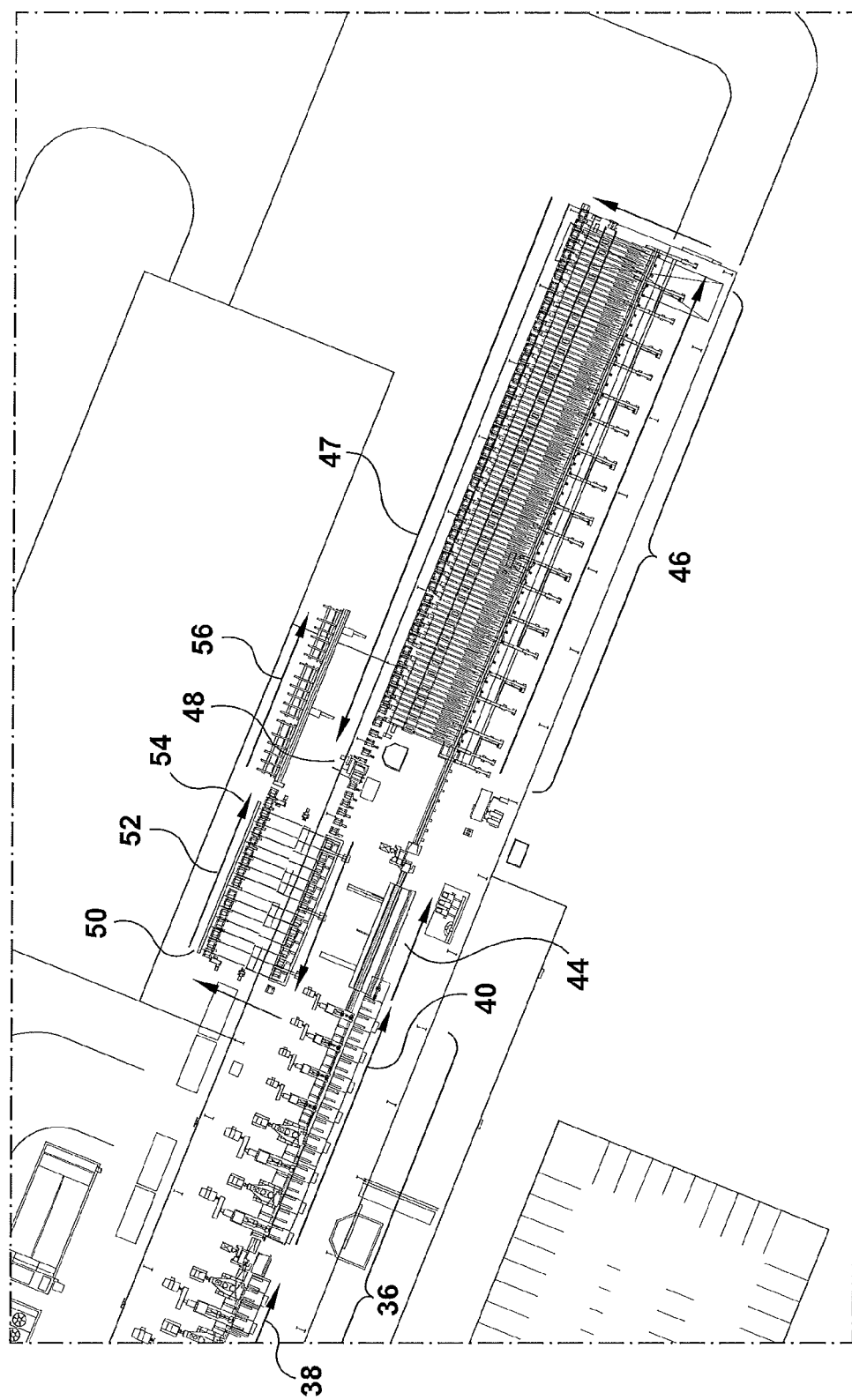
FIG. 2C is a view of the cutting and bundling portion of the process flow diagram of FIG. 1.

In some embodiments, as illustrated schematically in FIG. 1A for example, the modular micro mill 100 may be modified to incorporate a coiling line 60 into the production line. In such embodiments, once the long product produced through the rolling mill 36 exits the quenching area or thermo-processing station 44 it is diverted away from the process line before reaching the divide shear 45 where the long product is typically cut to cooling bed length prior to entry into the cooling bed 46. Instead, once the long product exits the thermo-processing station 44, it is re-directed towards the coiling line 60 where the long product is wrapped to form coils of product. From the coiling line 60, the coils of product are cooled independently (e.g. not on the cooling bed 46) and can be prepared for transport/delivery to the customer.

By providing a modular micro mill 100 where the scrap or pre-refined steel is melted in induction melting furnaces 16(1), 16(2) and where the casting portion of the mill is linked directly to the rolling mill portion of the mill via a billet staging station thereby avoiding having to cool and store formed billets prior to rolling the overall size of the steel mill is reduced with recognized improvements in the efficiency of the overall operation of the mill. This is also due, in part to limiting the overall production rate of the modular micro mill 100 and focusing the type of the steel product produced to various steel long products. Modifying the length of the billets produced by the caster 30 to about three times the length of standard or typical billets produced in traditional steel-making processes, and by controlling the operating speeds of the rolling mill to within a reduced range that is generally about half that of a traditional or standard steelmaking mill, which is possible due to the increased length of billets produced by the caster and the incorporation of a slitting process into the rolling mill portion 36 of the modular micro mill 100, have also been found to contribute to recognized improvements in the efficiency of the overall operation of the mill. As well, since the modular micro mill 100 provides a more continuous process without requiring a lengthy cooling stage and a complex reheating stage prior to rolling, the overall size of the mill is reduced and the cost effectiveness of the mill is improved since additional cooling and/or storage areas and expensive reheat furnaces are not required. Furthermore, by incorporating a pre-heating stage prior to the melting in certain instances that uses natural gas as opposed to electrical energy, can help to reduce overall electrical energy consumption of the mill in applications where pre-heating prior to melting is deemed appropriate since less energy is required to melt the material in the furnace and since natural gas is less costly than electrical energy which contributes to overall cost savings. Energy savings are also recognized due to the elimination of the cooling and more complex reheating stages prior to rolling often seen in traditional mills. In addition to the use of natural gas heating, in certain instances, and induction melting furnaces, by incorporating a quenching or thermo-processing system into the production line in lieu of more expensive alloying techniques to impart the desired strength properties in the steel, and by specifically tuning and/or adjusting the operation of the production line of the modular micro mill 100 based on the specific product requirements set by the customer, a "greener" and/or less-wasteful steel-making process may be achieved.

While exemplary embodiments of a modular micro mill and method of manufacturing a steel long product have been described, certain adaptations and modifications of the described embodiments can be made as understood by persons skilled in the art and as construed within the scope of the present disclosure. Therefore, the above discussed embodiments are considered to be illustrative and not restrictive.

What is claimed is:

1. A modular micro mill for manufacturing a steel long product, comprising:
   an induction melting furnace for melting pre-refined metal;
   a casting station arranged downstream from said induction melting furnace for receiving melted steel from said furnace, the casting station forming two strands of billets;
   a rolling mill arranged downstream from said casting station, the rolling mill comprising a series of roll stands for rolling and/or shaping the billets into a long product having a predetermined shape and form;
   a billet staging station arranged intermediate said casting station and said rolling mill, said billet staging station receiving said two strands of billets from said casting station and alternatingly delivering said billets directly to said rolling mill without cooling; and
   a pre-heating conveyor system for pre-heating said pre-refined metal prior to delivery to said induction melting furnace, wherein the pre-heating conveyor system comprises a natural gas combustion chamber for pre-heating said pre-refined metal to a temperature of about 900° F.;
   wherein the modular micro mill has an overall production rate of approximately 200,000-225,000 tons per year.

2. The modular micro mill as claimed in claim 1, further comprising:
   a thermo-processing station arranged downstream from the rolling mill for tempering the long product;
   a cooling bed for cooling the long product exiting the thermo-processing station; and
   a cold shear station arranged downstream from said cooling bed for cutting the long product exiting the cooling bed to a predetermined length to form a final product.

3. The modular micro mill as claimed in claim 1, wherein said induction melting furnace is a first induction melting furnace, the modular micro mill further comprising a second induction melting furnace, wherein the pre-heating conveyor system is mounted on a track structure, the pre-heating conveyor system shifting between a first operating position delivering pre-heated pre-refined metal to said first induction melting furnace and a second operating position delivering pre-heated pre-refined metal to the second induction melting furnace.

4. The modular micro mill as claimed in claim 1, wherein the pre-heating conveyor system is adapted to operate at a pre-heating rate of approximately 45 tons/hr.

5. The modular micro mill as claimed in claim 1, wherein the induction furnaces are adapted to operate to melt the pre-refined metal at a temperature of about 2900° F.

6. The modular micro mill as claimed in claim 2, further comprising a control system for controlling production parameters of the modular micro mill, the control system receiving data relating to the shape and form of the final product and adjusting the production parameters of components upstream within the modular micro mill.

7. The modular micro mill as claimed in claim 6, wherein the control system adjusts production parameters of the casting station, the rolling mill, thermo-processing station and cold shear station.

8. The modular micro mill as claimed in claim 1, further comprising an induction equalization furnace arranged downstream from the billet staging station for reheating the billets prior to entry into the rolling mill.

9. The modular micro mill as claimed in claim 8, wherein the induction equalizing furnace is adapted to re-heat the billets from a temperature of about 1600° F. to about 1950° F.

10. The modular micro mill as claimed in claim 1, wherein the billet staging station comprises:
   a pair of individual conveyors, each individual conveyor for receiving one of said strands of billets;
   a main conveyor for receiving a billet from each of said individual conveyors in an alternating fashion; and
   a ramp interconnecting each of said individual conveyors to said main conveyor;
   wherein each ramp can accumulate billets and hold them in queue prior to delivery to the main conveyor.

11. The modular micro mill as claimed in claim 2, wherein the thermo-processing station is in the form of a nozzle system for quenching.

12. The modular micro mill as claimed in claim 1, wherein the casting station is adapted for forming said billets with a generally circular cross-section with a diameter of about 4½ inches and a length of about 90 ft.

13. The modular micro mill as claimed in claim 1, further comprising:
   at least one pre-heated ladle for receiving melted steel from the induction melting furnace;
   a ladle metallurgy station for incorporating additives into the melted steel; and
   at least one pre-heated tundish for receiving melted steel from the ladle metallurgy station;
   wherein the at least one pre-heated tundish delivers the melted steel from the ladle metallurgy station to the casting station.

14. The modular micro mill as claimed in claim 1, wherein the rolling mill comprises a first, roughing portion having 6-8 roll stands and a second, finishing portion having a further 6-8 roll stands.

15. The modular micro mill as claimed in claim 14, wherein the rolling mill further comprises slitting stations for splitting a rolled billet exiting one of said roll stands lengthwise into two strands prior to entering a subsequent one of said roll stands.

16. The modular micro mill as claimed in claim 15, wherein the rolling mill is adapted to operate at operating speeds in the range of about 170 fpm to about 1500 fpm.

17. The modular micro mill as claimed in claim 1, wherein the casting station is adapted to operate at a rate of approximately 30 tons/hr with a speed of about greater than or equal to 110 ipm.

18. The modular micro mill as claimed in claim 1, further comprising a loading crane for transferring pre-refined metal to a conveyor system for delivery to said induction melting furnace, wherein the loading crane operates at a speed that exceeds the consumption rate of the induction melting furnace.

19. The modular micro mill as claimed in claim 2, further comprising a divide shear station intermediate said thermo-processing station and said cooling bed wherein the long product exiting the thereto-processing station is cut to a cooling bed length prior to entry onto the cooling bed.

20. The modular micro mill as claimed in claim 2, further comprising:
   a bundler for bundling groups of product together, the bundler forming sub-bundles, the sub-bundles being grouped together to form bundles; and
   a strapping machine for strapping and/or securing the sub-bundles and bundles of product together.

21. The modular micro mill as claimed in claim 19, wherein a coiling line is arranged downstream from said thermo-processing station, the long product exiting the thermo-processing station being diverted away from the divide shear station and cooling bed and being re-directed to said coiling line for coiling.

22. The modular micro mill as claimed in claim 1, further comprising:
   a fume collection system for collecting and safely discharging emission produced during operation of the modular micro mill, the fume collection system comprising:
      canopy structures arranged over fume and/or emission producing components of the modular micro mill; and
      a ducting system in communication with the canopy structures for collecting and discharging emissions produced during operation.

23. The modular micro mill as claimed in claim 1, further comprising an afterburner arranged in a chamber adjacent said pre-hearing conveyor system, said chamber and afterburner for collecting and burning-off products of combustion from said pre-heating conveyor system.

* * * * *